US006293697B1

(12) United States Patent
Gul

(10) Patent No.: US 6,293,697 B1
(45) Date of Patent: Sep. 25, 2001

(54) HOUSING FOR HVAC CONTROL UNIT

(75) Inventor: S. Asim Gul, Orono, MN (US)

(73) Assignee: Mamac Systems, Inc., Eden Prairie, MN (US)

(*) Notice: Subject to any disclaimer, the term of this patent is extended or adjusted under 35 U.S.C. 154(b) by 0 days.

(21) Appl. No.: 09/484,196

(22) Filed: Jan. 18, 2000

(51) Int. Cl.[7] .............................. G01K 1/16; H01H 37/02

(52) U.S. Cl. ................ 374/135; 174/52.1; 236/DIG. 19; 337/300

(58) Field of Search .......................... 236/46 R, DIG. 19, 236/78 R, 68 B; 337/300, 380, 398; 374/135, 208; 174/52.1

(56) References Cited

U.S. PATENT DOCUMENTS 5,485,954 * 1/1996 Guy et al. .......................... 236/78 R

FOREIGN PATENT DOCUMENTS

0199925 * 12/1982 (JP) .............................. 236/DIG. 19

* cited by examiner

*Primary Examiner*—William Wayner
(74) *Attorney, Agent, or Firm*—Kinney & Lange, P.A.

(57) ABSTRACT

An HVAC control unit is formed of a molded, electrically insulative material. The HVAC control unit has a wall plate and a cover plate. The wall plate attaches to a standard electrical box and has an opening for wires, and a cover plate attaches to the wall plate forming a sensor compartment. A vertical separation wall divides the sensor compartment into two chambers, namely, a temperature sensitive chamber and an electrical component chamber. Electrical contacts extend through the separation wall. The cover plate includes lower and upper ventilation openings to allow unforced air flow from the outside room through the temperature sensitive chamber. The vertical separation wall restricts air flow between the two chambers, closing the temperature sensitive chamber to the electrical component chamber. A gasket seals an edge of the vertical separation wall to further restrict air flow between the chambers. The temperature sensor is placed in the lower third of the temperature sensitive chamber. In the preferred embodiment, the HVAC unit extends into the room no more than one inch and is sized to no greater than four inches wide and six inches high. In one embodiment, the temperature sensitive chamber extends the full height from a bottom to a top of the sensor compartment. In another embodiment, the temperature sensitive chamber has a slanted top wall.

23 Claims, 5 Drawing Sheets

HOUSING FOR HVAC CONTROL UNIT

CROSS-REFERENCE TO RELATED APPLICATION(S)

None.

BACKGROUND OF THE INVENTION

The present invention relates to housings for heating, ventilation and cooling ("HVAC") Control Units, and, more particularly, to housings for units which simultaneously employ a room temperature sensor in conjunction with additional sensors and/or associated electronics.

HVAC control systems have long been used in buildings and residences. Many of the systems have units which include temperature sensors, and room temperature is a standard parameter used to determine how the HVAC system should be controlled. Many HVAC control systems also have other sensors, switches, and/or man-machine interfaces. For instance, in a standard thermostat, a temperature sensor is gauged against a temperature set point positioned by the user. If the sensed room temperature dips below the set point determined by the user, the heating system engages. The thermostat may include a switch for switching between heating and air conditioning modes. If the temperature increases above a set point in the air conditioning mode, the air conditioning unit engages. More recently, other types of sensors, such as pressure sensors, humidity sensors, or even gas sensors (carbon dioxide, carbon monoxide, etc.) may be used in the HVAC control systems. The mechanical sensors and switches of many prior art systems are being replaced by electrical sensors and switches, and various electrical components for manipulating electrical signals and/or power may also be included.

Primarily for aesthetic purposes, the components associated with the thermostat or other HVAC control units are typically positioned within a housing. The housing also protects the components from physical harm as well as from negative effects of dirt and light.

Housings for HVAC control units are designed to fulfill several goals. First, they must be readily installed with standard construction tools, techniques and materials, to minimize installation difficulties. The housings must be low cost, and are typically formed of low cost materials and with low cost manufacturing methods, such as injection molding. The housings must be durable to withstand any physical abuse during installation and during the life of the unit. The housings must also be aesthetically pleasing, as they are typically within view on a wall within a building. A new type of housing is required for certain HVAC control units to better fulfill these goals and to enhance the functionality of the HVAC control unit.

BRIEF SUMMARY OF THE INVENTION

The present invention is an HVAC control unit formed of a molded, electrically insulative material. As in prior art designs, the HVAC control unit includes a wall plate with an opening for wires to extend through the wall plate into a standard electrical box, to which the wall plate attaches. A cover plate is sized to fit the wall plate and is attached to the wall plate to form a sensor compartment. The present invention includes a vertical separation wall for dividing the sensor compartment into two chambers, namely, a temperature sensitive chamber and an electrical component chamber. The cover plate includes lower and upper ventilation openings to allow unforced air flow through the temperature sensitive chamber. The separation wall restricts air flow between the two chambers, closing the temperature sensitive chamber to air flow from the electrical component chamber. A sensor for a temperature sensitive parameter, such as temperature or humidity, takes readings within the temperature sensitive chamber. In the preferred embodiment, the HVAC unit extends into the room no more than one inch and is sized to be slightly larger in area than a standard electrical box.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Figure 1:
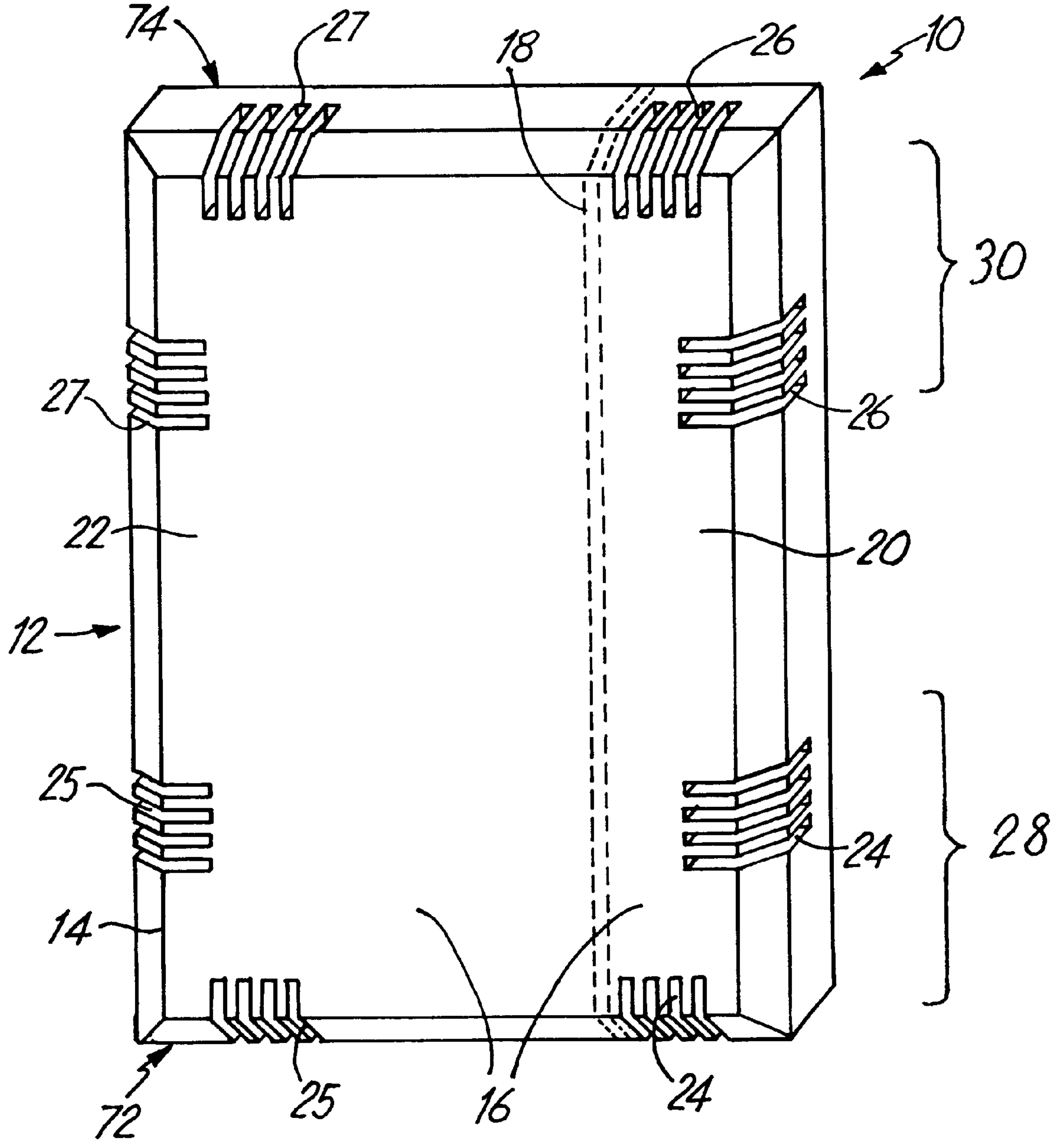
FIG. 1 is a perspective view of an HVAC control unit according to the present invention.

As shown in FIG. 1, the HVAC control unit 10 has a housing 12 including a face plate or cover plate 14. The control unit 10 is attached to a standard electrical box (not shown in FIG. 1), and when the control unit 10 is installed the cover plate 14 extends into a room in a building. The cover plate 14 is typically in full view by occupants of the room, and the cover plate 14 must be aesthetically pleasing. In part due to aesthetic appeal, the cover plate 14 must not be overly large. For instance, the cover plate 14 must extend from the wall no more than three inches, and more preferably no more than one inch. The cover plate 14 must have a height of no more than about ten inches, and more preferably no more than about six inches. The cover plate 14 must have a width of no more than about eight inches, and more preferably no more than about four inches.

The housing 12 of the present invention splits the control unit 10 into two discrete portions 16 separated by a divider wall 18. The divider wall 18 extends vertically as shown by dash lines in FIG. 1. The divider wall 18 separates the housing 12 into a temperature sensitive portion 20 (on the right in this embodiment) and an electrical component portion 22 (on the left in this embodiment). Openings or louvers 24,26 in the cover plate 14 permit the flow of air from the room into and out of at least the temperature sensitive portion 20. At least one louver 24 is positioned in the lower portion 28 of the temperature sensitive chamber 20, and another louver 26 is positioned in the upper portion 30 of the temperature sensitive chamber 20. If desired, additional louvers 25,27 may be provided in the electrical component portion 22 of the cover plate 14. If desired, a gauge, read-out, switch control, or other man-machine interface (not shown) may be provided in the cover plate 14.

The housing 12 of the present invention is particularly intended for use with electrical sensors, components or circuits 32 (shown in FIGS. 3 and 4), as opposed to more mechanically based sensors and switches (not shown) used in many prior art HVAC systems. Moreover, the housing 12 of the present invention is intended for use when a sensor 34 for a temperature sensitive parameter is used in conjunction with other electrical components 32 in a single housing 12. The preferred sensor 34 senses temperature, and the preferred embodiment is described with reference to a temperature sensor 34. Currently available temperature sensors produce little heat during operation so their operation does not affect the reading taken. If desired, the sensor 34 could alternatively be a sensor for any other temperature sensitive parameter. For instance, local relative humidity changes substantially as a function of local heating of the air. If desired, sensor 34 could be part or all of a humidity sensor, or both a temperature sensor and part or all of a humidity sensor. In either event, the humidity and/or temperature reading taken is separated from the electrical components 32 which generate heat. The HVAC control unit 10 may thus incorporate numerous functions (such as sensing pressure, humidity, gases, and/or signal manipulation) in a single housing 12, rather than in multiple housings used in prior art HVAC systems.

Figure 2:
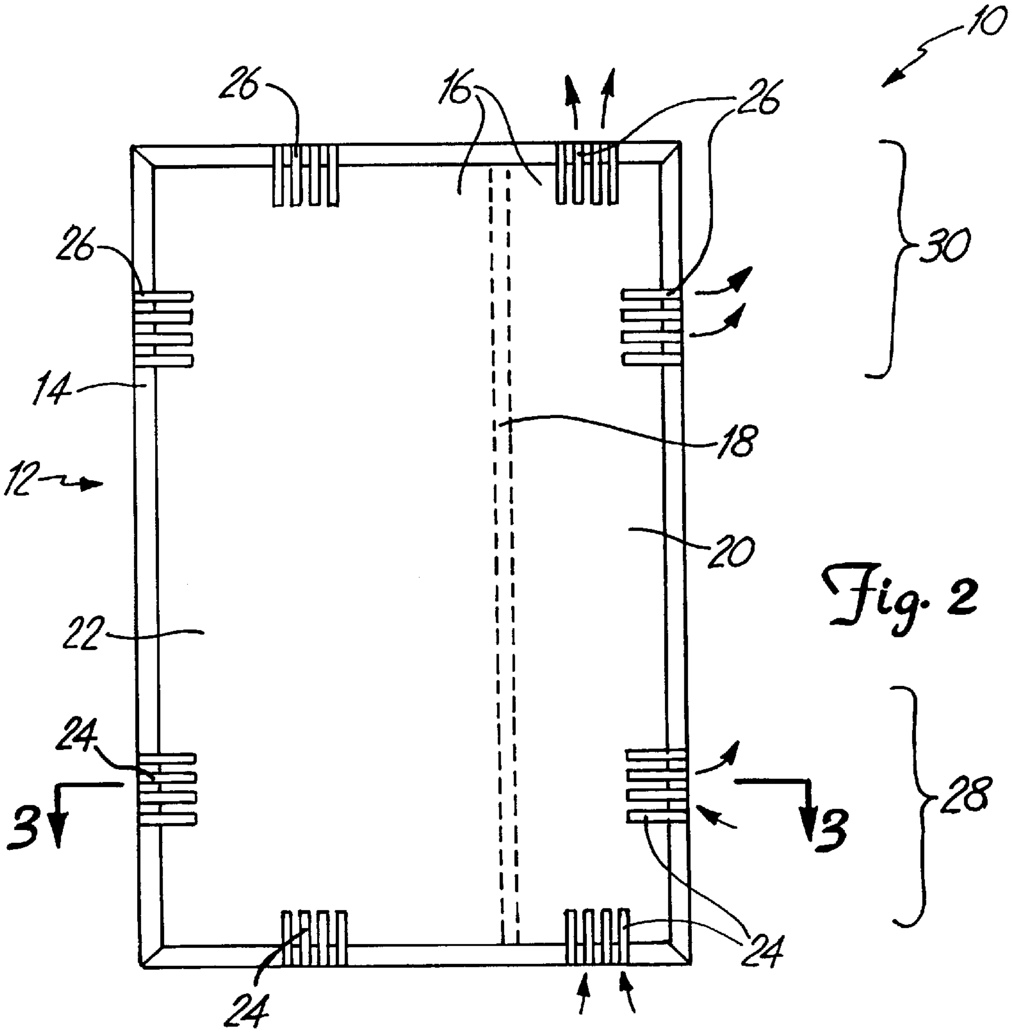
FIG. 2 is an elevational view of the HVAC control unit of FIG. 1.

During operation, the electrical components and circuits 32 give off heat. As shown by arrows in FIG. 2, the temperature sensitive chamber 20 extends the full height of the HVAC controller unit 10, and allows a flow of room air. Because heated air flows upward, room air heated by the electrical components/circuits 32 generates a flow upward into the bottom louvers 24 and out of the upper louvers 26.

Figure 4:
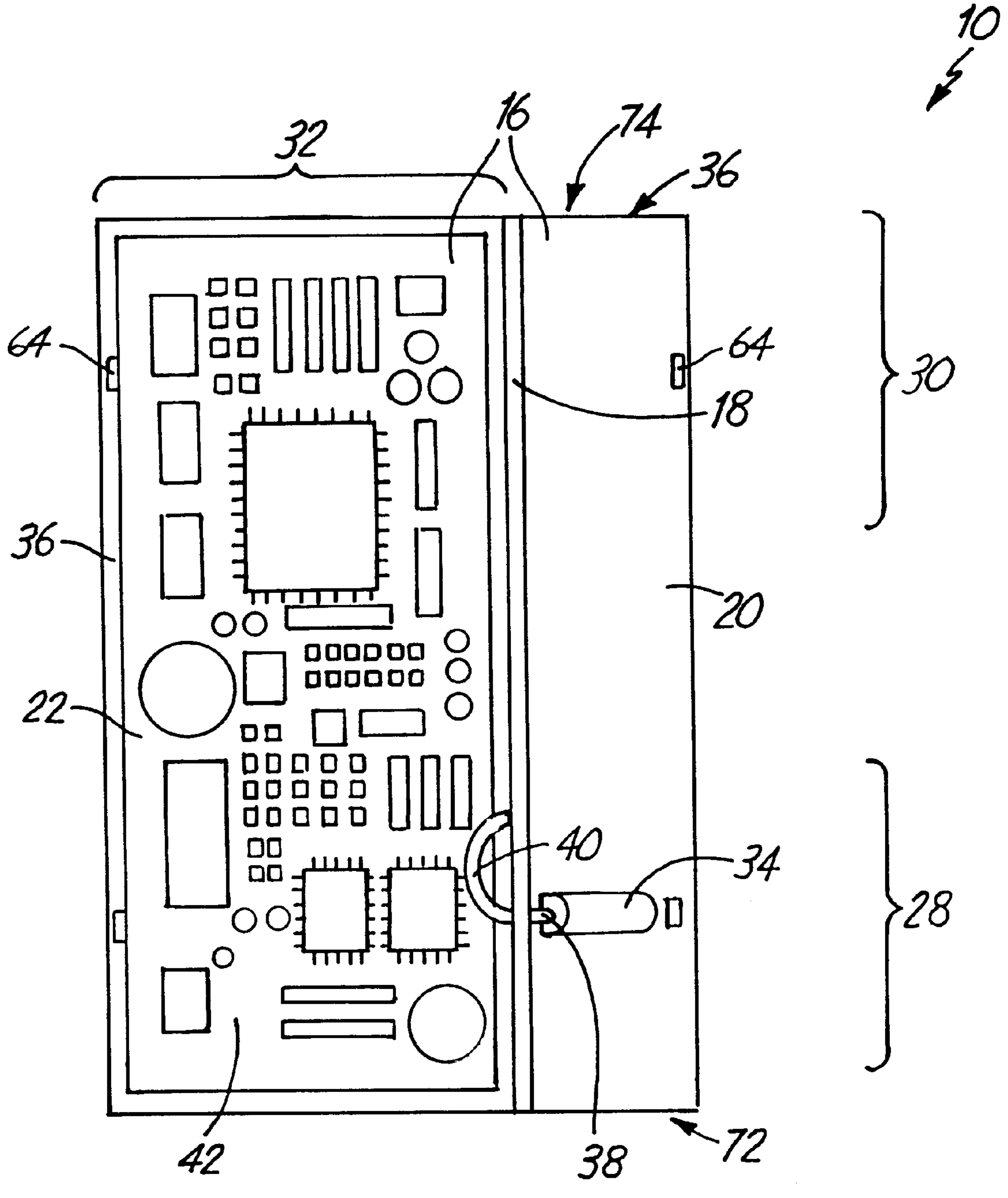
FIG. 4 is a front view of the HVAC unit of FIGS. 1–3 with the face plate removed.

FIG. 4 shows the HVAC control unit 10 with the cover plate 14 removed to show the backing plate or wall plate 36. A temperature sensor 34 is positioned in the temperature sensitive portion 20 of the housing 12. The temperature sensor 34 thus receives the benefit of the flow of room air through the temperature sensitive portion 20. The temperature sensor 34 is electrically connected through the vertical divider wall 18 by inserted molded leads 38. Alternatively, the wires 40 for the temperature sensor 34 may be fed through small openings (not shown) in the vertical divider wall 18.

The opposite side of the vertical divider wall 18 houses substantially all of the electrical components 32 for the HVAC control unit 10 other than the temperature sensor 34. In the preferred embodiment, this includes a circuit board 42 covered with electrical components 32 which include for instance a humidity sensor, a pressure sensor, a gas sensor, and associated electronics to interface with HVAC controller (not shown). In the preferred embodiment, the HVAC controller is housed elsewhere in the building, and the various sensors and circuits communicate with the HVAC controller through electrical wires run through the walls during construction of the building.

The electrical components 32 give off heat. In order to get an accurate temperature sensing of room air, the temperature sensor 34 needs to be thermally insulated from the electrical components 32. The housing 12 of the present invention provides the thermal insulation by virtue of the divider wall 18.

Figure 3:
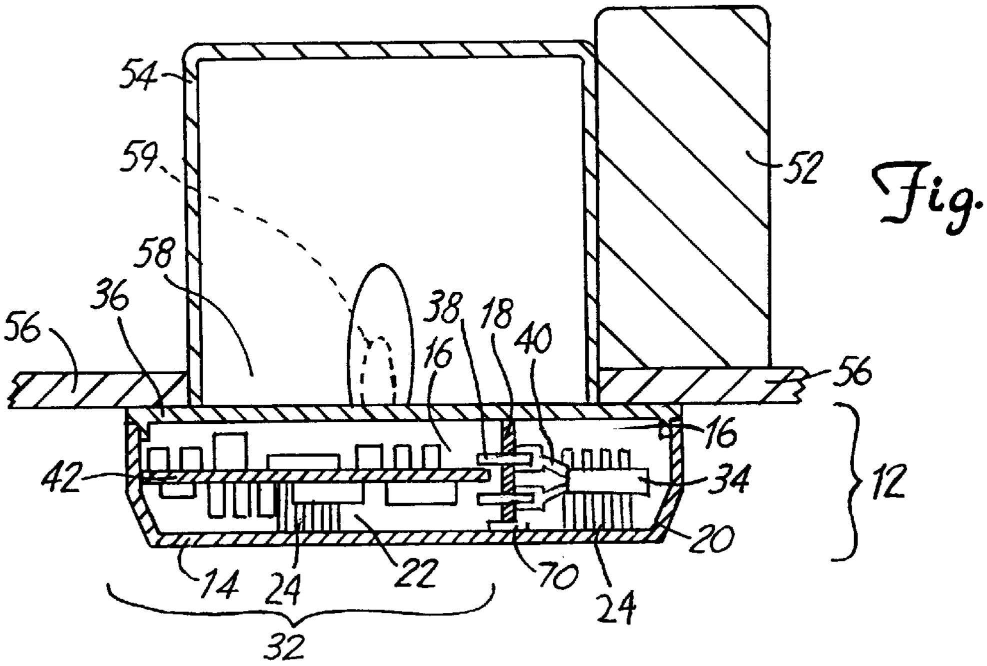
FIG. 3 is a cross sectional view of the HVAC unit taken along line 3—3 of FIG. 2.

FIG. 3 shows the unit as installed in construction. In typical construction, a framing unit 52 such as a 2×4 extends vertically, and an electrical box 54 is attached to the framing unit 52. A sheet covering 56 such as drywall is placed on the framing unit 52 to form the walls of the room. An opening 58 is cut through the drywall 56 into the electrical box 54.

Figure 5:
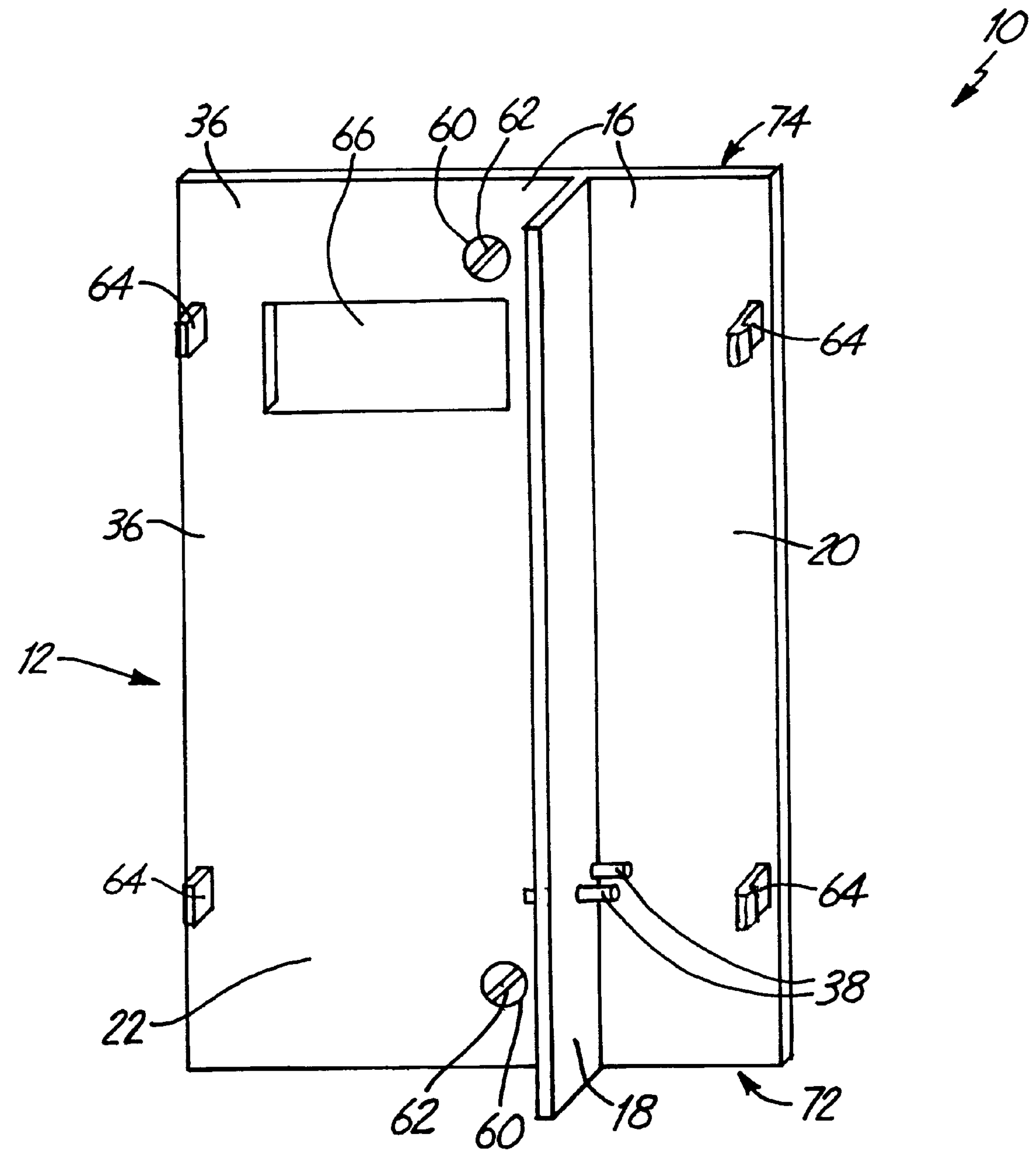
FIG. 5 is a perspective view of the backing plate of the HVAC control unit of FIGS. 1–4.

For instance, a standard electrical box 54 is about two inches wide, two inches deep, and four inches high. The electrical box 54 includes screw holes 59 for attachment of a wall plate or cover plate 14. As shown in FIG. 5, the backing plate 36 includes screw holes 60, and screws 62 are used to connect the backing plate 36 to the standard electrical box 54.

The cover plate 14 for the housing 12 is sized to fit to the backing plate 36 and is attached to the backing plate 36 in any way known in the art, including a one or more deflection tabs 64 which are received in openings of the cover (not shown) with a snap fit.

Both the cover plate 14 and the backing plate 36 of the housing 12 are preferably injection molded. For instance, the cover plate 14 and the backing plate 36 may be molded of polystyrene or acrylonitrile-butadiene-styrene ("ABS") plastic. The housing 12 must be molded to have sufficient strength not to break during use, during impact or during installation. For instance, the wall thickness in the cover plate 14, the backing plate 36 and the divider wall 18 is approximately 0.01 inches or greater, and preferably around 0.06 inches thick.

An opening 66 is provided in the backing plate 36 on the electrical component side 22. The opening 66 allows for electrical connections (not shown) from the electrical components 32 and the temperature sensor 34 into the electrical box 54. During use, a number of wires may extend from both the temperature sensor 34 and the circuit board 42 through the opening 66.

Importantly, the opening 66 for electrical connection into the electrical box 54 does not extend into the temperature sensitive chamber 20. The air within walls of a building may be substantially thermally insulated and at a different temperature than the air within a room. For instance, in northern climates during the winter, the air in the wall interior may be colder than the room air temperature by as much as 20–30° F. or more. It is as important to thermally insulate the temperature sensor 34 from this cold air source as it is to thermally insulate the temperature sensor 34 from the heat generating components 32 of the HVAC unit 10. The backing plate 36 provides a continuous back wall for the temperature sensitive chamber 20, which prevents air which may be circulated within the wall of a building from connecting into the temperature sensitive chamber 20 and contacting the temperature sensor 34.

A gasket 70 (shown in FIG. 3) is provided on the cover plate 14 to mate with the divider wall 18 to assure a tight insulation barrier between the heat generating components 32 and the temperature sensor 34. The divider wall 18 substantially restricts air flow between the temperature sensitive portion 20 and the electrical component portion 22 of the HVAC unit 10, and the gasket 70 further restricts air flow between the two portions 20,22. For example, the gasket 70 may be formed of a thin (approximately from one to two times the divider wall 18 thickness) strip of neoprene adhered to the inside of the cover plate 14.

Figure 6:
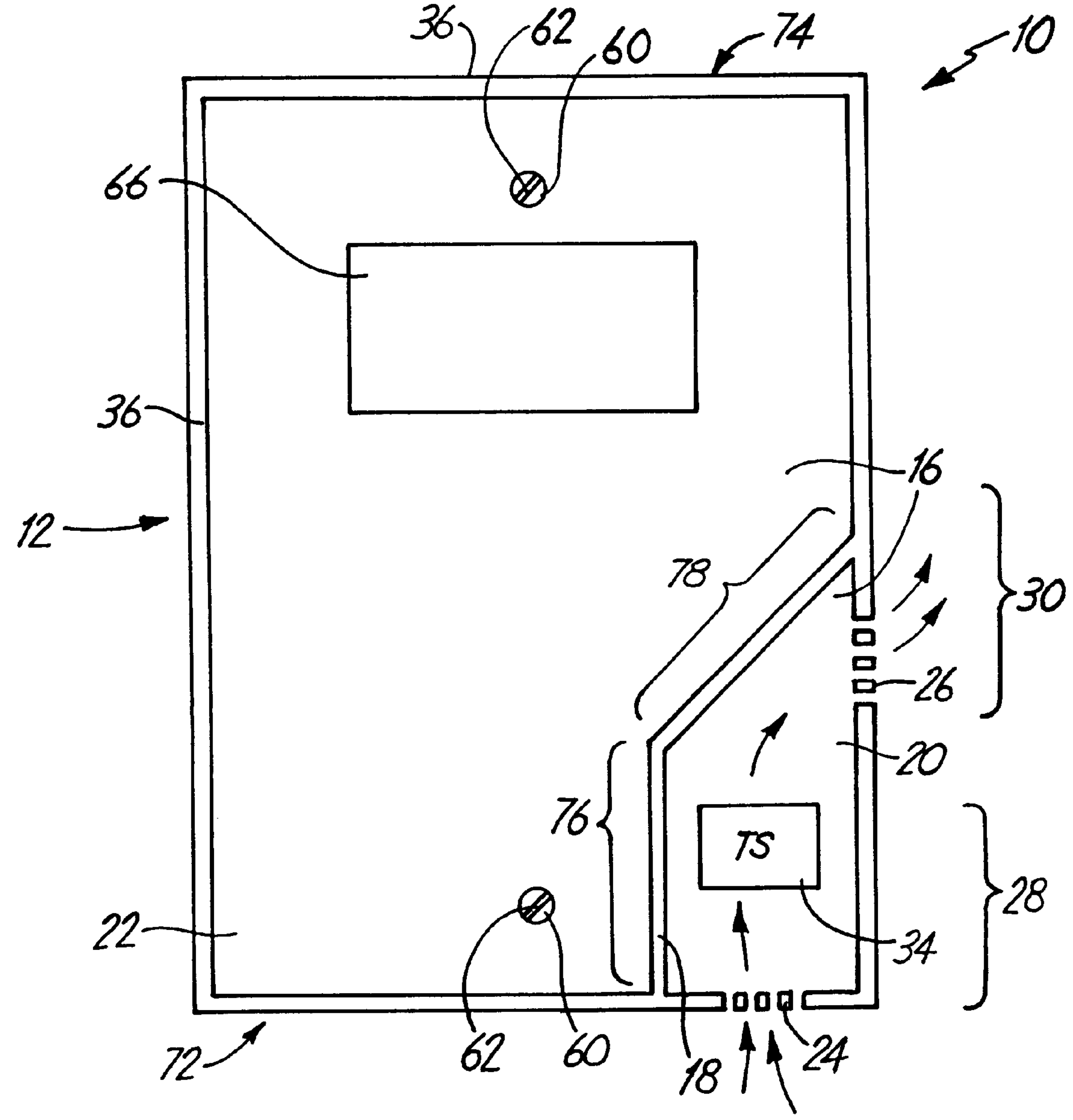
FIG. 6 is a elevational view of an alternative embodiment of a wall plate according to the present invention.

FIG. 6 shows an alternate embodiment of the present invention. In FIG. 6, the temperature sensitive portion 20 does not extend from bottom 72 to top 74 of the housing 12. Instead, the divider wall 18 has a vertical portion 76 and a slanted portion 78. This allows heat to rise and allows adequate flow of room air across the temperature sensor 34. In the embodiment of FIG. 6, the temperature sensitive chamber 20 takes up less room in the overall housing 12, but the flow of air across the temperature sensor 34 is not quite as great as in the embodiment of FIGS. 1–5. As evidenced by the embodiment of FIG. 6, the temperature sensitive chamber 20 can be quite small relative to the overall size of the housing. In fact, the temperature sensitive chamber 20 can be made as small as possible provided it is large enough to hold the active part of the sensor 34 and to provide air flow to the active part of the sensor 34.

In both embodiments, the temperature sensor 34 is located toward the bottom 72 of the housing 12, such as within about the bottom one-third of the housing 12. Because heated air rises, the bottom portion of the housing 12 is less likely to be affected by heat from the electrical components 32 than the top.

Other embodiments wherein the temperature sensitive portion 20 does not extend from bottom 72 to top 74 of the housing 12 are also possible. For instance, the bottom of the temperature sensitive chamber could be provided by a portion of the divider wall slanted upward from a side of the housing. The remainder of the divider wall could extend vertically upward from the slanted bottom to the top of the housing. Lower louvers can be positioned on the side of the cover panel immediately over the slanted bottom of the temperature sensitive chamber. Upper louvers can be positioned above the lower louvers, preferably on the top of the housing.

Alternatively, the temperature sensitive portion could be centered in the height of the housing and be defined by two slanted portions of the divider wall, both slanted portions intersecting the side of the housing. The lower louvers and the upper louvers can be positioned along the side of the housing.

All embodiments allow heat to rise and allow flow of room air cross the temperature sensor 34. In embodiments wherein the temperature sensitive chamber does not extend fully from bottom to top of the housing 12, the temperature sensitive chamber takes up less room in the overall housing 12, but the flow of air across the temperature sensor 34 is not as great as in the embodiment of FIGS. 1–5. Further, in embodiments wherein the temperature sensitive chamber does not begin at the bottom of the housing, the temperature sensor is necessarily placed higher in the housing 12 than in the preferred embodiment. Since heat rises, placement of the temperatures sensor 34 higher in the housing 12 increases the exposure of the temperature sensor 34 to heat from the electrical component portion 22.

Alternatively, the temperature sensitive chamber and the electrical component chamber could be positioned front to back, with some electrical components behind a divider wall. For example, some of the electrical components could be housed directly within the electrical box. A divider wall could extend vertically across the bottom half of the electrical box opening (i.e. coplanar with the drywall 56). Due to the potential exposure to heat if the temperature sensor 34 is placed higher in the housing 12, the temperature sensor 34 should be positioned in the lower portion. The cover plate could then affix to the electrical box defining a temperature sensitive chamber, which extends into the room. For instance, the bottom portion of the temperature sensitive chamber could be formed by a vertical portion of a divider wall, which does not extend the full height from bottom to top of the temperature sensitive chamber. The top of the temperature sensitive chamber could be formed by a divider wall extending from the vertical portion of the divider wall upward at an angle to the front of the cover plate. The temperature sensitive chamber should have at least two louvers to allow room air flow over a temperature sensor, a lower louver on the bottom of the housing and an upper louver on the front of the cover plate. A second set of lower and upper louvers could be positioned above the top of the divider wall to allow room air flow over other sensors.

Although the present invention has been described with reference to preferred embodiments, workers skilled in the art will recognize that changes may be made in form and detail without departing from the spirit and scope of the invention.

What is claimed is:

1. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and electrical contacts extending through the separation wall;

wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber.

2. The HVAC control unit of claim 1 further comprising:

a temperature sensor disposed in the temperature sensitive chamber such that the temperature sensor is within the bottom third of the sensor compartment.

3. The HVAC control unit of claim 1, wherein the lower openings are disposed at least in part on a bottom surface of the housing.

4. The HVAC control unit of claim 1, wherein the upper openings are disposed at least in part on a top surface of the housing.

5. The HVAC control unit of claim 1, wherein the wall plate has openings for attaching the wall plate to the standard electrical box with screws.

6. The HVAC control unit of claim 1, wherein the electrically insulative molded material is selected from the group consisting of: polystyrene and ABS plastic.

7. The HVAC control unit of claim 1, wherein the wall plate substantially closes the temperature sensitive chamber to air flow with the standard electrical box.

8. The HVAC control unit of claim 1, wherein the cover plate attaches to the wall plate with a snap fit.

9. The HVAC control unit of claim 1, wherein the temperature sensitive chamber extends full height from a bottom to a top of the sensor compartment.

10. The HVAC control unit of claim 1, wherein the sensor compartment is no greater than three inches deep.

11. The HVAC control unit of claim 1, wherein the separation wall is at least 0.01 inches thick.

12. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and a gasket between the separation wall and one of the cover plate and the wall plate to prevent air flow between the separation wall and said one of the cover plate and the wall plate;

wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber.

13. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber; and wherein the temperature sensitive chamber has a slanted top wall.

14. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber; and wherein the sensor compartment is at least one of wider than a standard electrical box and taller than a standard electrical box.

15. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and temperature sensor disposed in the temperature sensitive chamber such that the temperature sensor is positioned within the bottom third of the sensor chamber;

an electrical component disposed in the electrical component chamber, the electrical component being driven by electricity and generating heat during use, wherein the electrical component is selected from the group consisting of: a humidity sensor, a gas detector, and a pressure sensor;

a gasket disposed between the separation wall and one of the cover plate and the wall plate to prevent air flow between the electrical component chamber and the temperature sensitive chamber;

wherein lower openings and upper openings are defined at least in part on a bottom or top surface, respectively, of one of the wall plate or the cover plate;

wherein the separation wall is at least 0.01 inches thick and wherein electrical connections for the temperature sensor extend through the separation wall;

wherein the sensor compartment is no greater than one inch deep and is at least two inches wide and three inches high;

wherein the wall plate substantially closes the temperature sensitive chamber to air flow with the standard electrical box, wherein the wall plate has openings for attaching the wall plate to the standard electrical box with screws; and wherein the cover plate, the wall plate, and the separation wall are formed of electrically insulative molded material selected from the group consisting of: polystyrene and ABS plastic; and wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber.

16. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep; and a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment; and electrical contacts extending through the separation wall;

wherein ventilation openings are defined to permit outside room air ventilation into and out of the temperature sensitive chamber.

17. An HVAC control unit for use with an electrical box comprising:

a housing formed of an electrically insulative molded material comprising:

a cover plate extending no more than one inch in depth and sized to mate with an electrical box to form a sensor compartment no greater than four inches wide and six inches high, the cover plate having a plurality of ventilation openings; and a separation wall mating with the cover plate to define a temperature sensitive chamber and an electrical component chamber within the sensor compartment, the separation wall extending vertically less than full height from bottom to top of the housing, then extending at an angle toward the cover plate defining a top of the temperature sensitive chamber, the separation wall substantially closing the temperature sensitive chamber to air flow with the electrical component chamber; and wherein a plurality of ventilation openings are defined in the cover plate to permit outside room air ventilation into and out of the sensor compartment, the plurality of ventilation openings including lower openings and upper openings into the temperature sensitive chamber for unforced convection air currents to rise upward through the temperature sensitive chamber, the plurality of ventilation openings further including an additional opening for room air ventilation to the electrical component chamber.

18. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep; and a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment; and an electrical component disposed in the electrical component chamber, the electrical component being driven by electricity and generating heat during use, wherein the electrical component is selected from the group consisting of: a humidity sensor, a gas detector, and a pressure sensor;

wherein ventilation openings are defined to permit outside room air ventilation into and out of the temperature sensitive chamber.

19. An HVAC control unit comprising:

a housing formed of an electrically insulative molded material comprising:

a wall plate attachable to a standard electrical box, the wall plate having an opening for wires to extend through the wall plate into the standard electrical box;

a cover plate attachable relative to the wall plate, the cover plate and wall plate sized for mating together to form a sensor compartment no greater than eight inches wide and ten inches high; and a separation wall attached to one of the cover plate and the wall plate, the separation wall extending vertically to divide the sensor compartment into a temperature sensitive chamber and an electrical component chamber, the separation wall substantially closing the temperature sensitive chamber to air flow with the electrical component chamber; and an electrical component disposed in the electrical component chamber, the electrical component being driven by electricity and generating heat during use, wherein the electrical component is selected from the group consisting of: a humidity sensor, a gas detector, and a pressure sensor;

wherein ventilation openings are defined in one of the wall plate and the cover plate to permit outside room air ventilation into and out of the temperature sensitive chamber, the ventilation openings including lower openings and upper openings for unforced convection air currents to rise upward through the temperature sensitive chamber.

20. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep;

a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment;

temperature sensor disposed in the temperature sensitive chamber such that the temperature sensor is positioned within the bottom third of the sensor chamber;

an electrical component disposed in the electrical component chamber, the electrical component being driven by electricity and generating heat during use, wherein the electrical component is selected from the group consisting of: a humidity sensor, a gas detector, and a pressure sensor;

a gasket disposed between the separation wall and one of the cover plate and the wall plate to prevent air flow between the electrical component chamber and the temperature sensitive chamber;

wherein lower openings and upper openings are defined at least in part on a bottom or top surface, respectively, of one of the wall plate or the cover plate;

wherein the separation wall is at least 0.01 inches thick and wherein electrical connections for the temperature sensor extend through the separation wall;

wherein the sensor compartment is no greater than one inch deep and is at least two inches wide and three inches high;

wherein the wall plate substantially closes the temperature sensitive chamber to air flow with the standard electrical box, wherein the wall plate has openings for attaching the wall plate to the standard electrical box with screws; and wherein the cover plate, the wall plate, and the separation wall are formed of electrically insulative molded material selected from the group consisting of: polystyrene and ABS plastic;

wherein ventilation openings are defined to permit outside room air ventilation into and out of the temperature sensitive chamber.

21. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep; and a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment; and a gasket between the separation wall and one of the cover plate and the wall plate to prevent air flow between the separation wall and said one of the cover plate and the wall plate;

wherein ventilation openings are defined to permit outside room air ventilation into and out of the temperature sensitive chamber.

22. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep; and a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment; and wherein the temperature sensitive chamber has a slanted top wall; and wherein ventilation openings are defined to permit outside room air ventilation into and out of the temperature sensitive chamber.

23. An HVAC control unit comprising:

a housing formed of an electrically insulative molded material comprising:

a wall plate attachable to a standard electrical box, the wall plate having at least one opening for wires to extend through the wall plate into the standard electrical box;

a cover plate attachable relative to the wall plate, the cover plate and wall plate sized for mating together to form a sensor compartment from two to four inches wide, from four to six inches high and no greater than one inch deep; and a separation wall extending vertically and dividing the sensor compartment into a temperature sensitive chamber and an electrical component chamber, the separation wall substantially closing the temperature sensitive chamber to air flow with the electrical component chamber, the temperature sensitive chamber extending full height from a bottom to a top of the sensor compartment; and wherein the sensor compartment is at least one of wider than a standard electrical box and taller than a standard electrical box; and wherein ventilation openings are defined to permit outside room air ventilation into and out of the temperature sensitive chamber.

* * * * *